United States Patent [19]

Carns

[11] Patent Number: 5,381,987
[45] Date of Patent: Jan. 17, 1995

[54] UTILITY VEHICLE FOR TOWING AND SERVICING AIRCRAFT

[76] Inventor: William A. Carns, 108 Wisteria St., Mansfield, Tex. 76063-1836

[21] Appl. No.: 251,324
[22] Filed: May 31, 1994
[51] Int. Cl.$^6$ ............................................. B64C 25/50
[52] U.S. Cl. .................................. 244/50; 180/904; 414/426; 123/142.5 R
[58] Field of Search ............... 244/50, 53 A; 180/904, 180/68.2, 15; 414/426; 123/142.5 R; 126/271.2 R, 19.5

[56] References Cited

U.S. PATENT DOCUMENTS

| | | | |
|---|---|---|---|
| 1,862,114 | 6/1932 | Gilly | 126/93 |
| 2,078,116 | 4/1937 | Arndt | 126/93 |
| 2,240,674 | 5/1941 | Seitz | 123/142.5 R |
| 2,414,214 | 1/1947 | Spackman | 123/142.5 R |
| 2,949,972 | 8/1960 | Wirkkala | 180/19.1 |
| 3,038,550 | 6/1962 | Lehmann et al. | 180/14.1 |
| 4,289,095 | 9/1981 | Scherr | 123/142.5 R |
| 4,318,448 | 3/1982 | Cline | 180/14.1 |

*Primary Examiner*—David A. Bucci
*Assistant Examiner*—Anne E. Bidwell
*Attorney, Agent, or Firm*—Charles D. Gunter, Jr.

[57] ABSTRACT

A utility vehicle is shown for towing and servicing aircraft. The vehicle includes a frame and at least one tow hitch attached to the frame for towing an aircraft. An internal combustion engine is mounted on the frame within an enclosed interior and is connected by a power train to a pair of drive wheels for powering the vehicle. A heat recovery system within the enclosed interior receives warmed cooling air from the engine and products of combustion from the engine exhaust to route heated air to a flexible duct. The flexible duct is connected to an aircraft engine to be serviced in order to preheat the engine. The drive train of the vehicle includes a hydrostatic transmission and a differential gear box connected to the drive wheel axles. The hydrostatic transmission includes a self-centering servo mechanism for controlling the rate of speed change of the vehicle to prevent jerking an aircraft. Additional accessories are located on the vehicle which provide mobile servicing capability for servicing a variety of aircraft needs.

10 Claims, 2 Drawing Sheets

UTILITY VEHICLE FOR TOWING AND SERVICING AIRCRAFT

BACKGROUND OF THE INVENTION

1. Field of the Invention

The present invention relates to tow vehicles of the type used for maneuvering aircraft into and out of hangers or otherwise on the ground and for servicing such aircraft.

2. Description of the Prior Art

Aircraft, such as airplanes, have a power plant which cannot be used efficiently to move the aircraft a relatively short distance. For this reason, it is advantageous to have a riding, self-propelled utility vehicle which can be used to tow the aircraft to any desired position. The self-propelled unit would be attached to the aircraft at a convenient location, such as the aircraft nose wheel, and an operator controls the tow vehicle to move the aircraft to a desired ground location for subsequent takeoff. In addition to the obvious advantages obtained from a utility tow vehicle, a need also exists for an associated aircraft engine preheater on the utility vehicle. Cold weather or climate conditions have long been a problem in the aviation field when starting the aircraft engine due to the high viscosity of lubricants and difficulty of turning the engine over. Large international and commercial airports where large aircraft are serviced typically provide mobile self-contained heaters for providing heat to aircraft. However, it is often times a problem to start smaller aircraft where such large heaters are not available or where expense makes their use prohibitive. Such a need has particularly existed in smaller airports, flying clubs, and other areas where small aircraft may be hangered. Here, the cost of a self-contained preheater can be prohibitive.

A number of tow vehicles are known in the prior art for maneuvering aircraft from one position to another. One such prior art reference is U.S. Pat. No. 3,038,550 to Lehmann et al., issued Jun. 12, 1962. The Lehmann patent shows a hand-operated, gasoline powered tow vehicle which is adapted to engage the axle of the aircraft nose wheel to connect the vehicle thereto for moving the craft over the ground. The Lehmann vehicle is used to move jet fighter planes from hangers and parking areas to the flight line. In order to eliminate blind spots in the operator's vision, a pair of handle bar grips are provided for use by operators standing on either side of the transport vehicle. A separate power pack is provided to supply electrical energy to the aircraft for starting its engine. There is no provision for preheating aircraft engines. The steering mechanism is relatively crude and, in fact, the vehicle is not intended to be ridden by the operator.

U.S. Pat. No. 4,318,448, issued Mar. 9, 1982, to Cline, shows another small towing appliance which is used by an operator to tow vehicles to the ready line. It is a relatively light, battery powered unit which is not intended to be ridden and is operated in the nature of a hand cart.

U.S. Pat. No. 4,289,095, issued Sep. 15, 1981, to Scherr, shows a preheater for aircraft engines which utilizes as a source of thermal energy the hot water from an automobile engine. The preheater is not associated with a towing vehicle ridden by an operator.

The present invention has as one object to provide an improved towing vehicle which permits rapid and safe maneuvering of the vehicle.

Another object of the invention is to provide a relatively economical aircraft moving unit which can be utilized in the light aircraft industry by ground service or fixed base operators.

Another object of the invention is to provide an aircraft ground towing vehicle which is relatively light in weight and of small frame for ease of maneuverability in confined areas.

Another object of the invention is to provide a ground towing vehicle for aircraft which is adapted to engage a tow bar provided for use with a given aircraft, the vehicle being ridden by an operator during use.

Another object of the invention is to provide a tow vehicle which incorporates all of the commonly needed service features for servicing light aircraft and helicopters, with all of the necessary tools being provided in a compact unit.

Additional objects, features and advantages will be apparent in the written description which follows.

SUMMARY OF THE INVENTION

A utility vehicle is shown for towing and servicing aircraft. The vehicle includes a frame having a normally enclosed interior, an exterior with a steering deck in which an operator rides, the frame also having a plurality of ground engaging wheels mounted thereon. At least one tow hitch is mounted to the frame for towing an aircraft. Preferably, a tow hitch is mounted at either of opposite extents of the vehicle frame for engaging and towing aircraft. An air cooled, internal combustion engine is mounted on the frame within the enclosed interior and is connected by a power train to at least selected ones of the wheels for powering the vehicle. A heat collecting shroud is located within the enclosed interior. The shroud includes an inlet for receiving warmed cooling air passing over the engine and for receiving heat from products of combustion created by the engine. The shroud also has an outlet which communicates with the exterior of the enclosed frame. A flexible duct is connectable with the shroud outlet at one extent and is connectable with the aircraft engine to be serviced at an opposite extent in order to provide heated air to the aircraft engine to facilitate starting of the engine.

Preferably, the frame includes a pair of drive wheels mounted on an axle at one extent of the frame and at least one directional wheel located at an opposite extent of the vehicle frame. The air cooled, internal combustion engine is connected to the wheel axle of the drive wheels by the power train for powering the vehicle. The engine has a fly wheel fan for directing a flow of cooling air over the engine and has an exhaust manifold for exhausting products of combustion from the engine. The shroud receives the warmed cooling air which has passed over the engine and is further warmed by the products of combustion from the engine, whereby the shroud functions as a heat recovery means for providing pre-heated air to the aircraft engine being serviced for starting the engine. The drive train connecting the engine to the drive wheels includes a hydrostatic transmission and differential gear box connected to the drive wheel axles. The hydrostatic transmission includes a self-centering servo mechanism for controlling the rate of speed change of the vehicle to prevent jerking an aircraft being towed.

The vehicle of the invention preferably further includes first and second electrical outlet means, each being connected to a 12 volt battery which is mounted on the frame within the enclosed interior. The first and second electrical outlet means on the frame are connected by cable means to the aircraft motor being serviced to provide either 12 or 24 volt starting power to jumpstart an aircraft. An air compressor is also mounted within the enclosed interior of the vehicle frame. The air compressor drive pulley is driven by the vehicle engine and an associated air storage tank is provided for receiving compressed air which can be utilized to inflate aircraft tires and for other service needs. The orientation of the directional wheel of the vehicle is preferably controlled by a hydraulically powered, rack and pinion steering mechanism. Preferably, a pair of directional wheels are mounted on a vertical spindle at the front of the utility vehicle. The spindle is provided with an upper extent which is received within a wheel mounting bearing on the vehicle frame. A portion of the spindle shaft is geared to engage a mating geared surface of the output shaft of a hydraulic steering cylinder. The cylinder output shaft is positionable by means of a hydraulically powered steering unit mounted on the frame and controlled by an operator.

These and other objects and advantages of the present invention will become obvious to those skilled in the art as described in the following detailed description of a preferred embodiment in conjunction with the accompanying drawings.

DETAILED DESCRIPTION OF THE INVENTION

Figure 1:
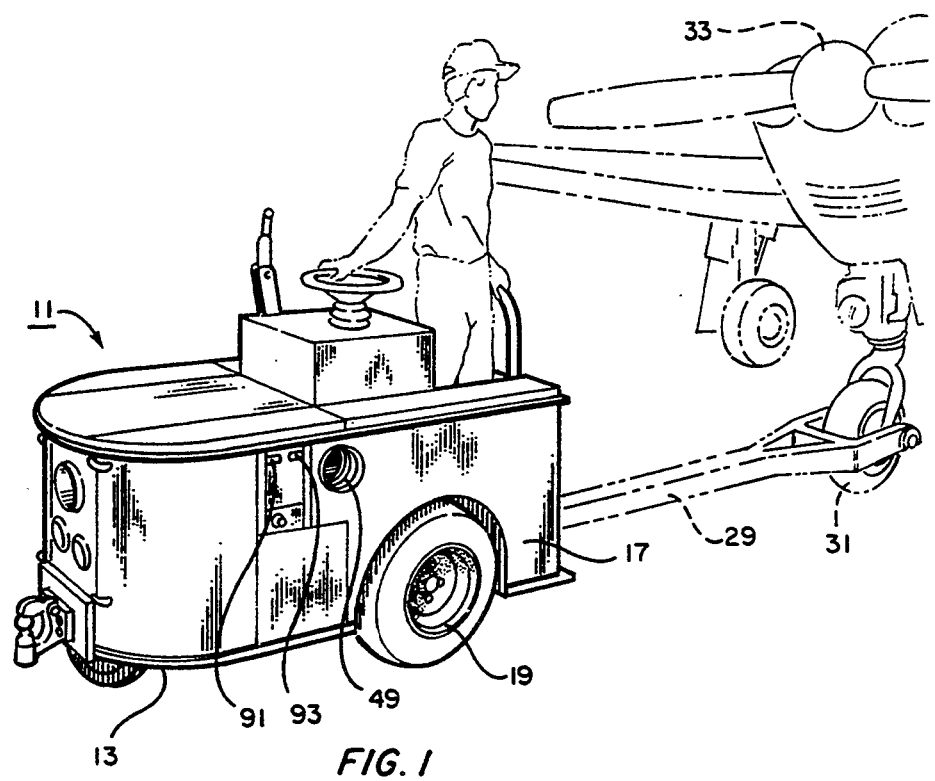
FIG. 1 is a perspective view of the utility vehicle of the invention showing its use by an operator and showing an aircraft being towed by a tow bar, the aircraft and tow bar being shown in phantom lines.
Figure 3:
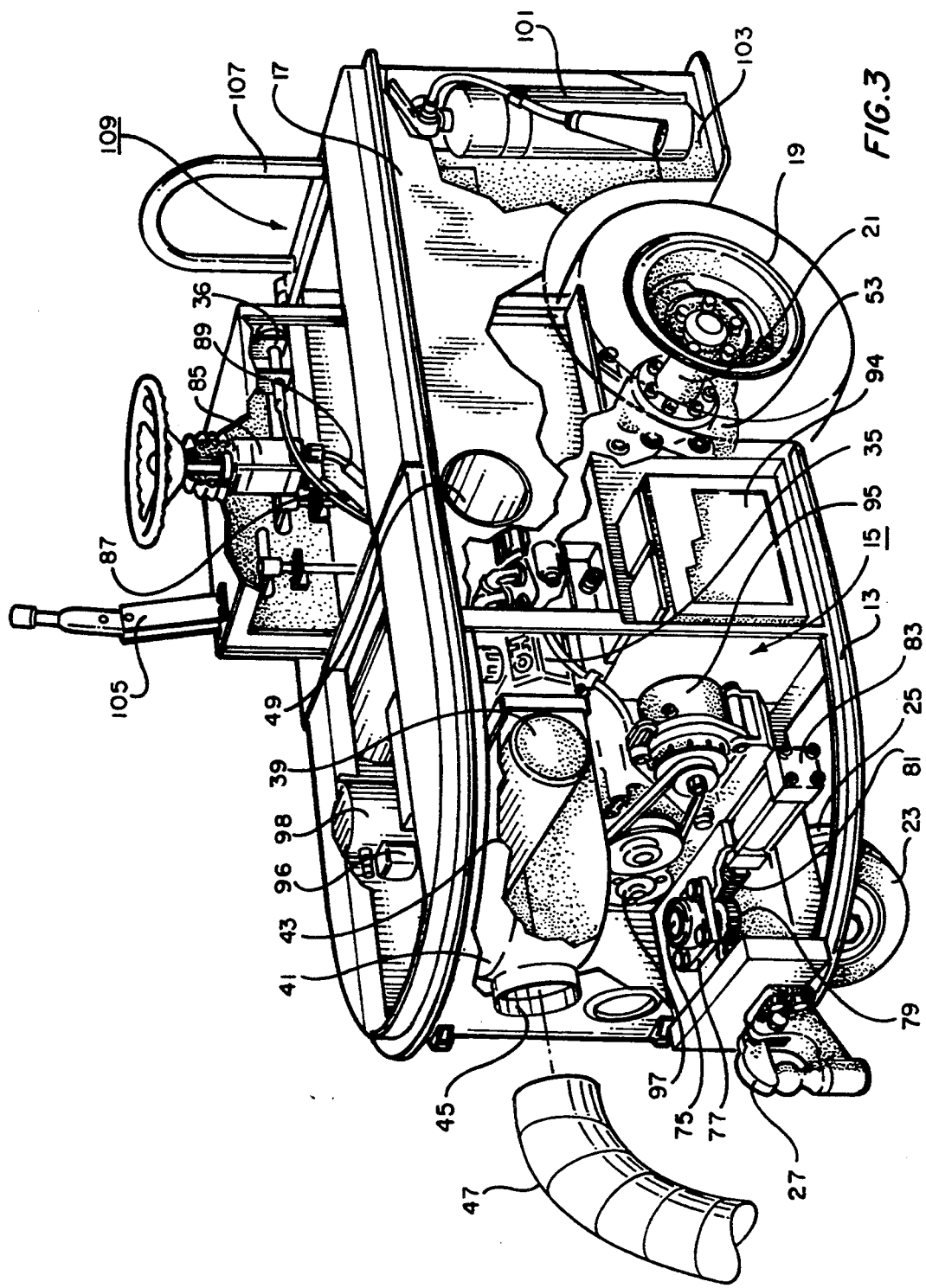
FIG. 3 is a side, perspective view, partially broken away, showing the major components of the utility vehicle of the invention.

FIG. 1 shows the utility vehicle of the invention designated generally as 11. The vehicle 11 includes a frame 13 having a normally enclosed interior 15 FIG. 3), an exterior 17 and having a plurality of ground engaging wheels mounted thereon. As best seen in FIG. 3, the ground engaging wheels include a pair of drive wheels (19 shown in FIG. 3) each mounted on an axle 21 at a rear extent of the frame 13. As will be more fully described, a pair of adjacent directional wheels (23, 25 in FIG. 3) are located at a front extent of the vehicle frame for determining the direction of travel of the vehicle.

At least one tow hitch 27 is connected to the frame 13 for towing an aircraft. As shown in FIG. 1, the vehicle preferably includes another rear mounted tow hitch which can be connected by means of a tow bar 29 to, for example, the drive wheel axle 31 of an aircraft 33 to be towed.

An air cooled, internal combustion engine (35 in FIGS. 2 and 3) is mounted on the frame within the enclosed interior 15 and is connected by a power train to the wheel axles 21 of the drive wheels 19 for powering the vehicle. Any of a number of commercially available, air cooled internal combustion engines are suitable for the present purpose. The preferred engine 35 is an 18 horse power Kohler "COMMAND" series "V" twin air cooled engine. The engine 35 is powered by 87–100 octane unleaded gasoline supplied by a tank (not shown) mounted in the vehicle interior. A throttle control 36 is mounted on the vehicle exterior for access by the vehicle operator.

Figure 2:
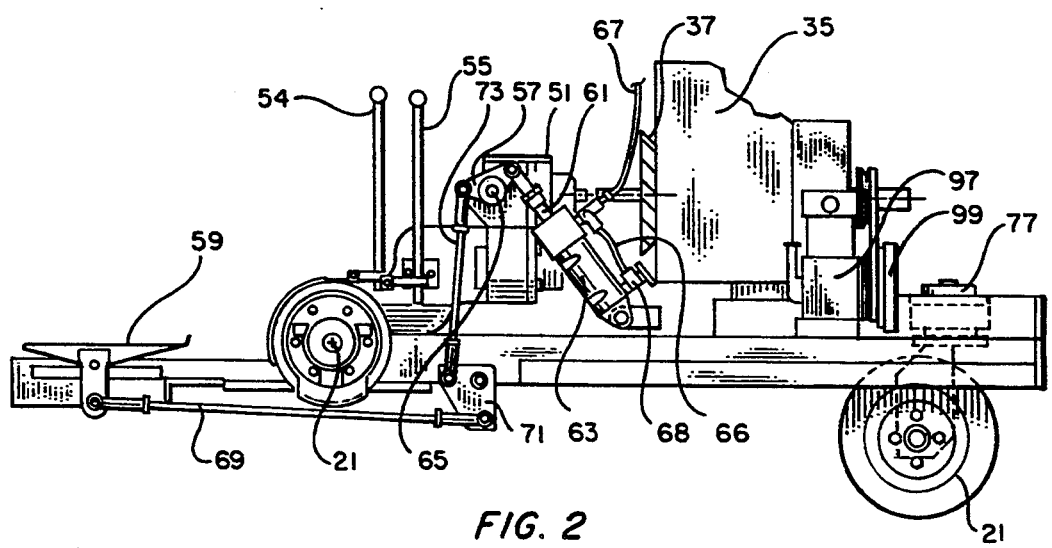
FIG. 2 is an isolated, side view of a number of the components of the drive train of the vehicle of FIG. 1 and showing the pedal control linkages for the hydrostatic transmission.

As shown in FIG. 2, the engine 35 has a flywheel fan 37 for directing a flow of cooling air over the engine and has an exhaust manifold, including spark arresting muffler 39 (FIG. 3) for exhausting products of combustion from the engine. The engine is fully enclosed with shrouds to contain the cooling air from the fan. These shrouds enclose the engine cylinders and discharge cooling air to a heat collecting shroud (41 in FIG. 3). The heat collecting shroud 41 is located within the enclosed interior 15. The shroud has inlet openings 43 for receiving the warmed cooling air which has passed over the engine cylinders. The entire engine exhaust system 39 is located within the heat collecting shroud 41. The cooling air, exhaust heat and products of combustion are combined within the heat collecting shroud 41. The heat collecting shroud 41 also has an outlet 45 which communicates with the exterior of the enclosed frame 13.

A flexible duct 47 is connectable with the shroud outlet 45 at one extent and is connectable with the aircraft engine to be serviced at an opposite extent in order to provide warm air to the aircraft engine to facilitate starting of the engine in cold weather or harsh environments. A cylindrical chamber 49 provided on the vehicle allows the flexible duct 47 to be stored when not in use. The shroud, in combination with the air cooled engine, allows heat to be recovered and channeled to the flexible duct 47 for heating an aircraft engine, providing 200° to 300° (above ambient) air at 30,000 to 100,000 BTU per hour.

As shown in FIG. 2, the drive train connecting the engine 35 to the drive wheels 19 includes a hydrostatic transmission 51 and a differential gear box 53 (FIG. 3) connected to the drive wheel axles 21. Preferably, the transmission is a commercially available Sundstrand-Sauer "15SERIES" hydrostatic transmission which allows precise control of both speed and power for the unit. These units feature a 0.913 cubic inch per revolution axial piston variable displacement pump coupled with a 0.913 cubic inch per revolution axial piston fixed displacement motor and are designed to operate at speeds up to 4,000 rpm and pressures up to 4,500 psi. The operation of hydrostatic transmissions of the above type will be understood by those skilled in the art, the transmissions consisting of a variable displacement, over-center swash plate, axial piston pump and fixed displacement, reversible axial piston motor. The basic transmission includes a charge pump and check valves, the charge pump being connected to a hydraulic reservoir and a filter section. As will be explained more fully, a control trunnion 65 is directly connected to the pump swash plate and controls the amount and direction of flow of hydraulic fluid to the motor, determining the speed and direction of the motor output shaft. Movement of the trunnion 65 provides a smooth, infinitely variable response for the transmission with speed being directly proportional to the trunnion position.

As shown in FIG. 2, the hydrostatic transmission 51 includes a self-centering servo mechanism for determining the position of the trunnion 65 and thus for controlling the rate of speed change of the vehicle to prevent jerking an aircraft being towed. The self-centering servo mechanism includes a pump control link 57 which is attached to the hydrostatic transmission at the trunnion 65 for controlling the transmission output. The pump control link is pivotally attached by suitable linkages to an operator controlled pedal 59 on one side of the control link 57 and is attached to the output shaft 61 of a double acting hydraulic cylinder 63 on an opposite side of the link 57. In the embodiment of FIG. 2, the pedal 59 is connected by means of a first linkage 69, link plate 71 and second linkage 73 with the pump control link 57.

The hydraulic cylinder 63 is a sealed unit that has been modified to contain an internal spring and position stops. The unit is spring powered to a center position. The unit is filled with a light grade hydraulic fluid. External piping 66 connects both ends of the cylinder to a small expansion tube 67. Installed in the piping is a flow control valve 68. Operator input on control pedal 59 is transmitted by the connecting linkages 69, 71 and 73 to the pump control link 57. The cylinder piston rod being connected to link 57 transmits the motion to the cylinder. As the piston rod moves, oil is forced out of the cylinder into the piping. The flow control valve is adjusted to control the rate of flow and thus the rate of speed change. When the operator releases pressure on the control pedal, the spring inside the cylinder becomes the dominant force in the system. The spring forces the cylinder, and via the linkages, the transmission to the neutral position. The internal spring and position stops are arranged to allow the described function in both directions. Thus the control functions for both forward and reverse rate of changes. The transmission pump and motor are piston type design. When the control trunnion is in the "neutral" position, internal oil flow stops and oil trapped in the motor cannot escape. The motor will hydaulically lock-up and resist rotation. This stop and hold condition functions as a "dead man" safety feature when the operator releases pressure on the control pedal.

The final drive in the power train is the Peerless transaxle drive with two speed gearing and automotive type differential 53 and a differential lock system. The manual control lever (55 in FIG. 2) is provided for shifting between high (24:1 reduction), neutral (disengaged) and low (40:1) reduction. Low is used when towing and high is used for transport. Control lever 54 is provided to engage the differential lock feature. Internal springs disengage the lock when the operator releases the lever. The differential lock allows maximum traction on slippery surfaces. By incorporating heavyduty (30 millimeter) axles 21 and cast iron housings, the unit can withstand heavy loading and severe service applications. The described power train can easily tow aircraft of 12,000 pound loads.

Steering is accomplished by means of the pair of directional wheels 23, 25 (FIG. 3) which are mounted on a vertical spindle 75, the spindle having an upper extent which is received within two Timkin type wheel mounting bearings (77 shown in FIG. 3) on the vehicle frame 13. A portion of the spindle upper extent 79 is geared to engage a mating geared surface 81 of the output shaft of a double acting hydraulic cylinder 83 to provide a rack and pinion mechanism.

Hydraulic fluid is supplied to the cylinder 83 from a commercially available TRW "hydraguide" HGF power steering unit 85. An inlet line 87 provides hydraulic fluid from the pump of the hydrostatic transmission 51 and outlet lines 89 supply hydraulic fluid to the steering control cylinder 83 which operates through the rack and pinion gearing to turn the directional wheels 23, 25 Rotation is plus or minus 60°, allowing for a minimum turning radius, thus providing excellent control of steering in confined spaces.

The power steering unit 85 will be familiar to those skilled in the art and consists of a fluid control valve section and a fluid metering section which are hydraulically and mechanically interconnected inside the unit. The unit includes a feed back control valve which is centered by two sets of three coil springs. The valve regulates pressure and directs pump flow to the steering cylinder 83. The valve is of an open-center type; when in the neutral position, it allows fluid to flow from the pump to the pressure port, through the unit to the return port and back to the reservoir. The metering section of the unit meters fluid to the control cylinder 83, maintains the ratio of hand wheel turns to the direction of the steered wheels and acts as a pump for manual steering in the event high pressure fluid does not reach the unit.

The utility vehicle also includes a first electrical output means (terminal 91 in FIG. 1) on the frame for supplying a first voltage value and a second electrical outlet means (terminal 93) on the frame for supplying a second voltage value. The first and second terminals 91, 93 are wired to a pair of 12 volt batteries (95 shown in FIG. 3) to provide both a 12 and 24 volt DC output in series. A dual voltage jumper cable is provided with a polarized plug to allow the operator to select the desired voltage. The operator simply plugs the plug into the desired voltage terminal 91, 93. The other end of the jumper cable has a polarized plug for connection to the aircraft. The normal plug connects to most popular aircraft receptacles. An adapter can also be provided to connect to "Piper" type receptacles. The 900 amp battery system will start most piston engine aircraft and some smaller jet engines. Up to 60 amps of continuous power is available to operate accessory items such as power tools, service lighting and radios.

The batteries 95 are charged by a Niehoff alternator 95 of a brushless design which does not emit radio interfering static. The alternator 95 is a 65 amp unit with heavy-duty bearings designed for maximum service life.

An air compressor (97 in FIG. 3) is mounted within the enclosed interior 15 of the vehicle frame. The air compressor has a drive pulley 99 and an electric clutch integrated with the drive pulley. The clutch is controlled by means of a pressure switch (96 in FIG. 3) mounted on an air storage tank 98. This arrangement allows the compressor 97 to be off line when not in use, resulting in reduced fuel consumption and maximum compressor life. The pressure switch 96 is adjustable from 50 to 120 psi. A separate safety relief valve on the storage tank is factory set at 120 psi.

Fire safety is enhanced by the provision of a 10 pound ABC rated fire extinguisher 101 enclosed within a compartment 103 which provides weather and physical protection for the extinguisher while allowing quick access. Other storage compartments are provided on the vehicle for storage of tools, cleaning supplies and other needed items. Auxiliary power options can be easily installed on the basic vehicle design. A power shaft and mounting holes are provided to allow installing an additional hydraulic pump to power accessories such as snow blowers, mowers and other PTO applications.

Braking is accomplished as a function of the hydrostatic transmission 51. However, when the engine is not running, there is no hydraulic pressure to make the system work. The transmission will automatically revert to the stop and hold condition. For this reason, a neutral position is included in the gear train, controlled by the manual lever 55. Should it be necessary to move the vehicle with the engine stopped, the neutral position allows the vehicle to move without sliding the tires. Oversized wheel brakes are used to secure the machine when parked. A large brake control lever 105 is top mounted on the vehicle so as to be visible to the operator at all times.

A hinged gate 107 and platform area (generally at 109 in FIG. 3) provide a steering deck for the operator providing improved visibility as well as a convenient operating position.

An invention has been provided with several advantages. The utility vehicle of the invention is economical in design and relatively easy to manufacture. The vehicle allows for the convenient towing and servicing of a variety of light aircraft providing many of the commonly needed accessories and tools in one convenient and compact unit. The vehicle has sufficient power to tow aircraft up to about 12,500 pounds. Hitch points on both ends of the vehicle allow maximum control when positioning an aircraft in tight locations. The precisely controlled hydrostatic transmission reduces possible damage from jerking an aircraft during use. The hydrostatic braking feature includes a dead man automatic stop and hold feature. Steering for the unit is hydraulic over rack and pinion with an automatic manual backup system to prevent steering loss should hydraulic system failure occur. Provisions for preheating aircraft engines include a unique heat recovery system located within the vehicle interior which provides adjustable air temperature from 200° to 300° F. above ambient. Compressed air is provided by an on-board air compressor with pressure being adjustable from 50 to 120 psi. Both 12 and 24 volt power is provided to start most piston engine aircraft and smaller jets.

While the invention has been shown in only one of its forms, it is not thus limited but is susceptible to various changes and modifications without departing from the spirit thereof.

What is claimed is:

1. A utility vehicle for towing and servicing aircraft, the vehicle comprising:
  a frame having a normally enclosed interior and an exterior and having a plurality of ground engaging wheels mounted thereon;
  at least one tow hitch connected to the frame for towing an aircraft;
  an air cooled, internal combustion engine mounted on the frame within the enclosed interior and connected by a power train to at least selected ones of the wheels for powering the vehicle;
  a heat collecting shroud located within the enclosed interior, the shroud having an inlet for receiving warmed cooling air passing over the engine and for receiving heat from products of combustion created by the engine, the shroud also having an outlet which communicates with the exterior of the enclosed frame;
  a flexible duct connectable with the shroud outlet at one extent and connectable with an aircraft engine to be serviced at an opposite extent in order to provide heated air to the aircraft engine in order to facilitate starting of the engine.

2. A utility vehicle for towing and servicing aircraft, the vehicle comprising:
  a frame having a normally enclosed interior and an exterior and having a plurality of ground engaging wheels mounted thereon, the ground engaging wheels including a pair of drive wheels mounted on an axle at one extent of the frame and at least one directional wheel located at an opposite extent of the vehicle frame;
  at least one tow hitch connected to the frame for towing an aircraft;
  an air cooled, internal combustion engine mounted on the frame within the enclosed interior and connected by a power train to the wheel axle of the drive wheels for powering the vehicle, the engine having a flywheel fan for directing a flow of cooling air over the engine and having an exhaust manifold for exhausting products of combustion from the engine;
  a heat collecting shroud located within the enclosed interior, the shroud having an inlet for receiving warmed cooling air passing over the engine and for receiving heat from products of combustion passing out the exhaust manifold, the shroud also having an outlet which communicates with the exterior of the enclosed frame;
  a flexible duct connectable with the shroud outlet at one extent and connectable with an aircraft engine to be serviced at an opposite extent in order to provide warm air to the aircraft engine to facilitate starting of the engine in cold weather.

3. The utility vehicle of claim 2, wherein the power train connecting the engine to the drive wheels includes a hydrostatic transmission and a differential gearbox connected to the drive wheel axles.

4. The utility vehicle of claim 3, wherein the hydrostatic transmission includes a self-centering servo mechanism for controlling the rate of speed change of the vehicle to prevent jerking an aircraft being towed.

5. The utility Vehicle of claim 4, wherein the self-centering servo mechanism includes a pump control link attached to the hydrostatic transmission for controlling transmission output, the pump control link being pivotally attached by a suitable linkage to an operator controlled pedal on one side of a pivot point and being attached to an output shaft of a double acting hydraulic cylinder on an opposite side of the pivot point.

6. The utility vehicle of claim 5, further comprising a first electrical outlet means on the frame for supplying a first voltage value and a second electrical outlet means on the frame for supplying a second voltage value and cable means for selectively connecting the aircraft engine to either the first or second outlets to jumpstart an aircraft.

7. The utility vehicle of claim 6, wherein the first and second electrical outlet means are each connected to a twelve volt automotive battery mounted on the frame within the enclosed interior thereof.

8. The utility vehicle of claim 7, further comprising an air compressor mounted within the enclosed interior of the vehicle frame, the air compressor having a drive pulley which is driven by the vehicle engine, the air compressor having an associated air storage tank for receiving compressed air, the air compressor having an electric clutch and the storage tank having a pressure switch for controlling the electric clutch whereby the air compressor can be switched off when the pressure within the storage tank exceeds a predetermined limit.

9. The utility vehicle of claim 8, wherein the orientation of the directional wheel mounted on the vehicle frame is controlled by a hydraulically powered, rack and pinion steering mechanism.

10. The utility vehicle of claim 9, further comprising: a pair of adjacent directional wheels mounted on a vertical spindle, the spindle having an upper extent which is received within a wheel mounting bearing on the vehicle frame, at least a portion of the spindle being geared to engage a mating geared surface of the output shaft of a double acting hydraulic cylinder, the cylinder output shaft being positionable by means of a hydraulically powered steering unit mounted on the frame.

* * * * *